No. 765,919. PATENTED JULY 26, 1904.
C. L. GIBBS.
DENTAL IMPRESSION CUP.
APPLICATION FILED OCT. 1, 1903.
NO MODEL.
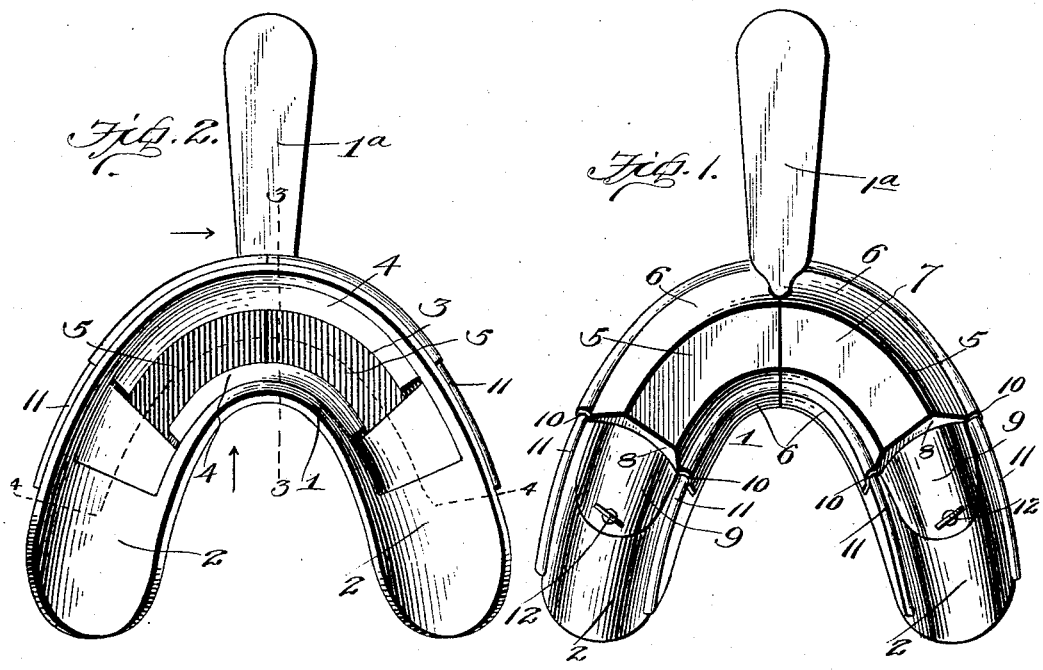
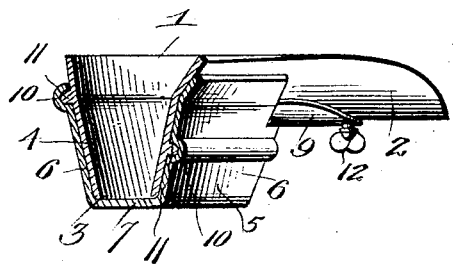
Witnesses
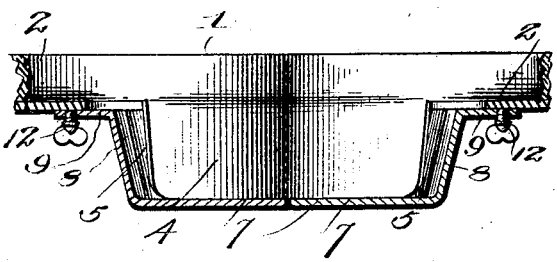
Inventor
Charles L. Gibbs
By
Attorney No. 765,919.

Patented July 26, 1904.

UNITED STATES PATENT OFFICE.

CHARLES L. GIBBS, OF PHILADELPHIA, PENNSYLVANIA.

DENTAL IMPRESSION-CUP.

SPECIFICATION forming part of Letters Patent No. 765,919, dated July 26, 1904.

Application filed October 1, 1903. Serial No. 175,372. (No model.)

*To all whom it may concern:*

Be it known that I, CHARLES L. GIBBS, a citizen of the United States, residing at Philadelphia, in the county of Philadelphia and State of Pennsylvania, have invented certain new and useful Improvements in Dental Impression-Cups; and I do declare the following to be a full, clear, and exact description of the invention, such as will enable others skilled in the art to which it appertains to make and use the same.

This invention relates to dental impression-cups for use in taking impressions of the gums for partial plates for artificial teeth.

The object of the invention is to provide a dental cup in which the usual opening formed for the reception of isolated teeth, to allow the cup to be closely pressed against the gums, may be lengthened or shortened or entirely closed, as circumstances may require, thus enabling the cup to be adjusted according to the number of teeth remaining in the jaw of which an impression of the gums is to be made.

The invention consists of a dental cup embodying certain peculiarities of construction and combination of parts, as will be hereinafter fully described and claimed, reference being had to the accompanying drawings, in which—

Figure 1 is a top plan view of a dental cup embodying my invention. Fig. 2 is a bottom plan view of the same. Fig. 3 is a vertical longitudinal section taken on the line 3 3 of Fig. 2, and Fig. 4 is a vertical transverse section taken on the line 4 4 of Fig. 2.

The cup 1, which is of segmental form to conform to the outline of the gums, is provided with the usual handle 1ª and with imperforated channeled end portions 2, between which is a slot or opening 3, adapted to receive the remaining teeth to allow the said portions 2 to rest upon the back portions or ridges of the gums from which the teeth have been extracted. From the sides of this slot or opening rise walls 4, which are somewhat shorter than the slot and serve to prevent the cup from shifting and to form supports and guides for slides 5. These slides, of which two are employed, consist of caps or covers formed each of front and back walls 6, a top wall 7, and an outer end wall 8, the inner end of the slide being open to allow the teeth of the patient to project up without interference between the walls 4 and to allow the slide to have free movement on said walls. As shown, the top wall 7 covers an extent of the slot corresponding to the length of the slide, and the two slides when brought together cover the slot for a distance a little greater than the length of the walls 4, the end portions of the slot being covered when the slides are so adjusted by wings 9, projecting from the end walls of the slides. These wings 9 correspond to the curvature of the portions 2 and fit snugly against the same when the slides are open, so as to permit the cup to be easily adjusted within the mouth. The slides have recesses 10 to receive guide-ribs 11 on the front and back of the cup, whereby they are guided and held from dislocation. Set-screws 12 are provided to secure the slides in adjusted position.

By the adjustment of the slides it will be seen that the slot 3 may be entirely closed or lengthened or shortened, as desired, and that while said slot receives the teeth the portions 2 will rest upon the back portions of the gums, thus allowing a perfect impression of the gums at both front and back to be taken.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A dental impression-cup having an offset portion provided with a slot or opening, and means adjustable longitudinally on said offset portion for varying the length of said slot or opening, substantially as described.

2. A dental impression-cup having imperforate channeled ends and an intermediate offset portion provided with a slot or opening, and adjustable caps or covers for varying the length of said slot or opening, each cap or cover comprises side walls having a sliding engagement with the sides of the offset portion, a connecting-wall for closing the slot or opening of said offset portion, and an end wall to limit its inward movement, substantially as described.

3. A dental cup having a slot therein, walls rising from the sides of said slot, forming an elevated or offset portion, and slides adjustable on the walls to regulate the length of said opening, substantially as described.

4. A dental cup having a slot therein, walls rising from the sides of said slot and of less length than said slot, forming an elevated or offset portion, and slides adjustable on the walls to regulate the length of said opening, each of said slides having a wing to close the slot beyond the walls, substantially as described.

In testimony whereof I have hereunto set my hand in presence of two subscribing witnesses.

CHARLES L. GIBBS.

Witnesses:
 HARRY REDEKER,
 CARRIE REDEKER.